United States Patent
Lynt, III

(10) Patent No.: US 7,845,742 B2
(45) Date of Patent: Dec. 7, 2010

(54) MOBILE STORAGE UNIT WITH ENVIRONMENTAL MONITORING SYSTEM

(75) Inventor: William W. R. Lynt, III, Fort Atkinson, WI (US)

(73) Assignee: Spacesaver Corporation, Fort Atkinson, WI (US)

( * ) Notice: Subject to any disclaimer, the term of this patent is extended or adjusted under 35 U.S.C. 154(b) by 823 days.

(21) Appl. No.: 11/363,877

(22) Filed: Feb. 28, 2006

(65) Prior Publication Data
US 2007/0210912 A1    Sep. 13, 2007

(51) Int. Cl.
*A47B 95/00* (2006.01)
(52) U.S. Cl. ............................. 312/201; 141/4; 141/94; 340/577; 340/602; 340/584; 220/23.2; 312/200
(58) Field of Classification Search ...................... 141/1, 141/4, 63, 84, 94, 98; 340/517, 577, 584, 340/586, 602; 220/23.2, 23.4; 49/368, 370; 312/201, 200
See application file for complete search history.

(56) References Cited

U.S. PATENT DOCUMENTS

| | | | |
|---|---|---|---|
| 4,119,376 A | 10/1978 | Moyer | |
| 4,547,026 A | 10/1985 | French et al. | |
| 4,869,874 A | 9/1989 | Falat | |
| 5,208,162 A | 5/1993 | Osborne et al. | |
| 5,417,487 A | 5/1995 | Dahnert | |
| 6,157,306 A | 12/2000 | Mularoni | |
| 6,901,971 B2 | 6/2005 | Speasl et al. | |
| 2004/0246104 A1 * | 12/2004 | Baechtiger et al. | 340/10.41 |
| 2005/0035694 A1 | 2/2005 | Stevens | |

FOREIGN PATENT DOCUMENTS

WO    WO 03107243 A2 * 12/2003

* cited by examiner

*Primary Examiner*—Timothy L Maust
*Assistant Examiner*—Jason K Niesz
(74) *Attorney, Agent, or Firm*—Andrus, Sceales, Starke & Sawall, LLP

(57) ABSTRACT

The present invention is a mobile storage unit for use within a mobile storage unit system that includes an environmental monitoring system on the storage unit. The monitoring system includes one or more sensors disposed on one or more of the mobile storage units that are configured to sense a particular environmental condition in the environment surrounding the mobile storage unit. The sensors are each operably connected to a controller associated with the mobile storage system that is capable of receiving signals from the sensors and analyzing the signals to determine the presence or absence of the environmental condition to be sensed by the sensors. If the condition is present, the controller can transmit an alert signal to an alarm system or to a separate notification device, such as a telephone or computer terminal, in order to alert an individual or the appropriate authorities to the presence of the hazardous environmental condition in the vicinity of the mobile storage system.

8 Claims, 1 Drawing Sheet

MOBILE STORAGE UNIT WITH ENVIRONMENTAL MONITORING SYSTEM

FIELD OF THE INVENTION

The present invention relates to storage systems including mobile storage units, and more specifically to an environmental condition monitoring system for use with a mobile storage unit and/or a mobile storage system including the mobile storage unit.

BACKGROUND OF THE INVENTION

In a large number of mobile storage systems, mobile storage units are selectively movable with respect to one another in some manner, such as along tracks or rails to which the units are mounted. The units can be moved along the tracks or rails in a manually operated manner, or through the use of a motor operably connected to wheels disposed on the storage unit and rotatably engaged with the rails to enable the storage unit to move with respect to the rails. In those storage units employing an electric motor, upon activation of the motor by a user activated switch, the motor operates a drive system that rotates the wheels of the unit to move the unit along the rails in the desired direction.

On many occasions, a storage system with mobile storage units is located in an enclosed environment in order to protect, or restrict access to, the storage units, which often contain valuable items and/or restricted information. To provide additional protection for such items and information, the enclosed area in which the mobile storage units are located can be locked or otherwise secured in order to restrict access to the information and items located on the mobile storage units. Additionally, the enclosed area may have a regulated environment that assists in preserving the items located in the storage system, such as a humidity-controlled environment for certain types of library or museum artifacts, or a temperature-controlled environment for items that are sensitive to temperature extremes or that must be stored in certain temperature conditions.

However, in a variety of circumstances, due to the location and/or restrictions regarding access to the mobile storage units in enclosed areas, the current environmental conditions within the enclosed area are not readily apparent. Also, for enclosed areas that are environmentally regulated, the access to such areas is necessarily even more limited in order to maintain the regulated environment, which further hinders the observation of the conditions within the enclosed areas. In these situations, the enclosed areas cannot readily be visually monitored in order to determine whether any fire, water, or other damaging environmental conditions exist within the enclosed area. For this reason, a number of well known sensing devices have been developed that can be positioned within an enclosed area, in order to determine whether any environmental conditions exist within the enclosed area that could potentially harm or damage any of the items or information located in the mobile storage units of the mobile storage system within the enclosed area.

The prior art sensing devices, such as fire alarms, smoke alarms, moisture or water sensors, etc., must be installed within the enclosed area and also require installation and maintenance of a separate operating system. This increased cost of adding such systems to monitor an enclosed area often renders such installations cost prohibitive, such that the stored items or information are unprotected. Also, with a number of these sensing devices, the devices must be placed at certain locations within the enclosed area due to structural limitations or other factors that limit that available locations in which the devices can be installed. However, it is often the case that the available locations do not allow the sensing device to adequately sense conditions in those parts of the enclosed area that may have already experienced the adverse conditions, with the resulting detrimental effect on the stored items or information, before the sensing device reports the presence of the adverse conditions.

Therefore, it is desirable to develop a mobile storage system that incorporates sensors on the storage units for sensing various conditions within the immediate area in which the mobile storage unit system is located, in order to provide an indication of such conditions to an individual monitoring the mobile storage system. It is also desirable to develop a mobile storage system that is capable of sending notification signals concerning the detection of one or more hazardous environmental conditions directly to an individual responsible for monitoring the mobile storage system.

SUMMARY OF THE INVENTION

According to one aspect of the present invention, a mobile storage system includes a number of mobile storage units movably disposed with respect to one another, such as on two or more rails, in order to enable the storage units to be moved relative to one another along the rails. Each of the storage units is capable of holding a number of various types of items thereon. At least one of the storage units includes one or more sensing devices capable of determining the presence of a specific environmental condition within the immediate area in which the mobile storage units are located. The sensing devices may be disposed in a redundant manner on each storage unit such that each of the storage units is capable of generating a separate and independent signal regarding the environment immediately surrounding that storage unit. The sensing devices on the respective storage units are each operably connected to a signal receiver and transmitter, preferably disposed within the frame of one of the mobile storage units in the system. The receiver and transmitter receive the various signals from the individual sensing devices and transmit the signals to a display device. A representation of the various signals from the sensing devices can be displayed on the display device to an individual in order to alert the individual to the presence of any detrimental environmental conditions in the vicinity of one or more of the storage units.

According to another aspect of the present invention, an environmental monitoring system for use with a mobile storage system can be manufactured in a manner that enables the environmental monitoring system to be retrofitted onto existing mobile storage systems.

According to still another aspect of the present invention, the environmental monitoring system can be modified to determine the presence of any number or combination of hazardous or detrimental environmental conditions surrounding the individual storage units of the mobile storage system.

Numerous other features, aspects, and advantages of the present invention will be made apparent from the following detailed description taken together with the drawing figures.

BRIEF DESCRIPTION OF THE DRAWINGS

The drawing figures illustrate the best mode currently contemplated as practicing the present invention.

In the drawings.

DETAILED DESCRIPTION OF THE INVENTION

Figure 1:
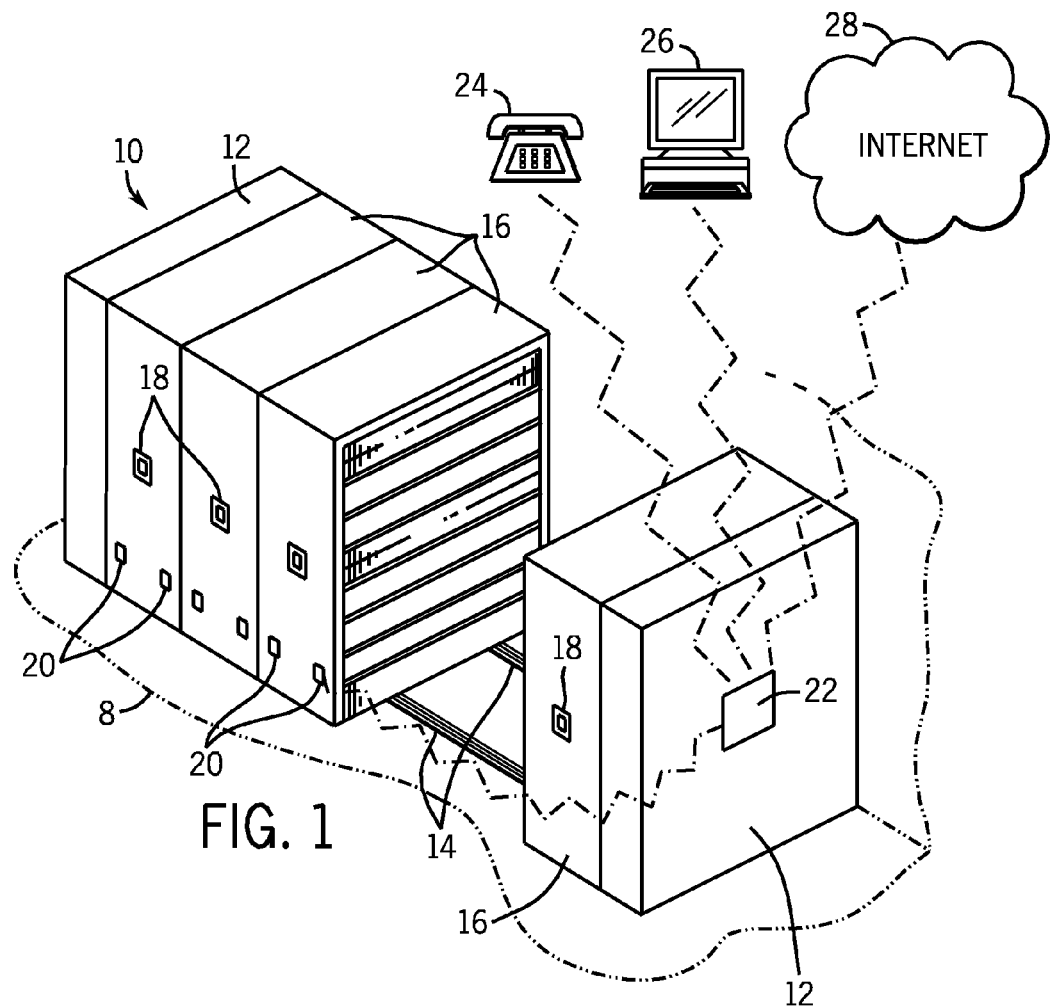
FIG. 1 is an isometric view of a mobile storage system incorporating the environmental monitoring system of the present invention.

With reference now to the drawing figures in which like reference numerals designate like parts throughout the disclosure, one embodiment of a mobile storage system is indicated generally at 10 in FIG. 1. In this exemplary embodiment, the storage system 10 is disposed over a floor or other surface 8 and includes a pair of end members 12 between which extend a pair of parallel rails 14 secured to floor 8. Representatively, the end members 12 may be in the form of stationary storage units. The rails 14 movably support a number of individual storage units 16 thereon through the engagement of spaced apart pairs of wheels (not shown) that are rotatably mounted to each storage unit 16 and are rotatably supported on the rails 14. In a preferred embodiment, the wheels rotatably mounted to each storage unit 16 are operably connected to an electric motor (not shown) that can be operated to rotate the wheels and move each unit 16 along the rails 14. It should be understood that the illustrated configuration of storage system 10, and the number, type and sizes of storage units 16, is representative of a myriad of different configurations of storage system 10 and the number, type and size of the storage units used in the storage system. Storage systems of this general type are available from Spacesaver Corporation of Fort Atkinson, Wis.

Each of the individual storage units 16 can be moved along the rails 14 by operation of a motion control input unit 18 which may be disposed on one or both sides of each mobile storage unit 16. The motion control input unit 18 is operably connected to the electric motor and serves to operate the motor to rotate the wheels in order to move the storage units 16 in a desired direction, in a manner as is known.

Figure 2:
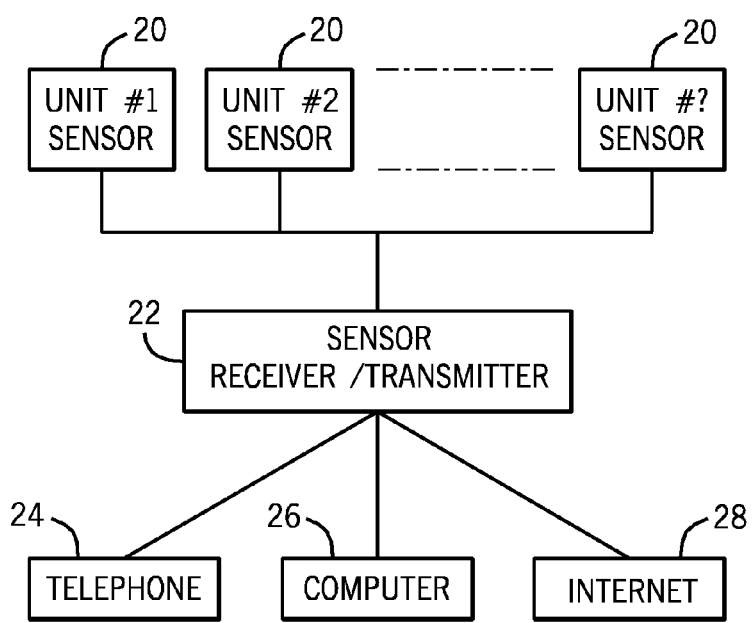
FIG. 2 is a schematic view of the environmental monitoring system incorporated in the mobile storage system of FIG. 1.

Referring to FIGS. 1 and 2, at least one of the storage units 16 also includes one or more sensing devices 20 disposed thereon. A sensing device 20 may be located on each end of the storage unit 16, but can be located in virtually any location on the unit 16. Each sensing device 20 is configured to determine the presence of one or more certain specific environmental conditions in the area surrounding the storage unit 16 to which the sensing device 20 is mounted. The sensing devices 20 may be operable to sense a single environmental condition, or the sensing device 20 may be operable to sense multiple environmental conditions. For example, a particular sensing device 20 can be configured to sense any of a number of different environmental conditions such as temperature, heat, light, humidity, water, air quality, and vibration, among others.

The drawings illustrate sensing devices 20 mounted to certain ones of the storage units 16. It is understood, however, that a sensing device 20 may be mounted to only one of the storage units 16, or to any number of the storage units 16 (including all of the storage units 16). The sensing devices 20 may be configured such that each sensing device 20 senses a different environmental condition, or may be configured such that all of the sensing devices sense the same environmental condition(s), as desired and according to user requirements. The number and types of sensing devices 20 on each storage unit 16 can be selected as desired.

Each of the sensing devices 20 is powered by a suitable power source (not shown) which, in a preferred embodiment, is also utilized to operate the electric motor that moves the individual storage units 16. However, the sensing devices 20 can also each include an individual and/or backup power supply (not shown), or can be connected to a completely separate power supply as well.

Each sensing device 20 is operably connected to a suitable controller 22. The controller 22 may be located on each individual storage unit 16, or as in the illustrated embodiment, only one controller 22 can be located on one storage unit 16 or on one of the end panels 12 to function in conjunction with each of the sensing devices 20 on all of the storage units 16 in the mobile storage system 10. The sensing devices 20 and controller 22 form an environmental monitoring system for the storage system 10. The sensing devices 20 can be operably connected to the controller 22 in any suitable manner, such as by wireless signals generated by the sensing devices 20 that are received by the controller 22, and vice versa, or by a physical connection, e.g., a wire, extending between the sensing devices 20 and the controller 22. Any physical or hardwired connections extending between the sensing device 20 and the controller 22 can be formed between one sensing device 20 and an adjacent sensing device 20 on an adjacent storage unit 16, to create a serial connection of the sensing devices 20 and the controller 22 to minimize the number of connections that are required. Alternatively, the physical connections can be formed directly between the controller 22 and each of the sensing device 20, such that the sensing devices 20 are connected to the controller 22 in parallel, and any problems with the connection between the controller 22 and one sensing device 20 will not affect the connections of the other devices 20.

The controller 22 is capable of analyzing the signals received from any or all of the sensing devices 20 in order to determine whether any detrimental or hazardous environmental conditions exist as indicated by the signals transmitted by the sensing devices 20. This is accomplished in any desired manner, but in a preferred embodiment is done by comparing a parameter value (e.g., the sensed temperature, heat, humidity, water, light, air quality, or vibration value) as sensed by the particular sensing device 20 and comparing that value to an acceptable value or range of values stored in the controller 22. If the sensed value does not match, or falls outside the stored value(s) or threshold(s), the controller 22 determines that a hazardous condition is present.

Should one or more detrimental or hazardous conditions exist as determined by the signals received from the sensing devices 20, the controller 22 is operable to create and send an alert signal to a remote location, to notify an individual of the particular detrimental or hazardous environmental condition at the location of the mobile storage system 10. The alert signals generated by the controller 22 can be sent to the remote location in a variety of manners, such as by a phone call to a telephone 24, by a signal sent to a computer terminal 26, or a signal sent via the internet 28 to any number or type of additional notification devices (not shown).

When an alert signal sent by the controller 22 has been received by an individual at the remote location, the individual can then utilize the particular notification device, such as the computer terminal 26 or other device connected to the internet 28, to determine the specific parameters of the sensed condition around the mobile storage system 10, and/or the particular location of the condition with regard to each of the storage units 16 in the system 10. In certain circumstances, the individual can also use the notification device to direct the controller 22, which can also be operably connected to the motion control units 18 for each storage unit 16, to attempt to alleviate or eliminate the potential amount of damage caused to items in the storage units 16 by the sensed environmental conditions, such as by moving the storage units 16 into locations where the condition is not being sensed, or is sensed at a less hazardous level. For example, in a situation where the area in which the storage system 10 is located has become partially flooded, an individual can review the alert signal sent by the controller 22 to determine the location of the water relative to each of the storage units 16, and can reactively move the storage units 16 via the controller 22 in order to move as many storage units 16 as possible away from the area in which the water is being sensed by the sensing devices 20 on the storage units 16.

Various alternatives are contemplated as being within the scope of the following claims particularly pointing out and distinctly claiming the subject matter regarded as the invention.

What is claimed is:

1. A method for monitoring at least one environmental condition in the external area around a mobile storage system having a plurality of mobile storage units, the method comprising the steps of:
   A) providing a sensor on one or more of the storage units;
   B) detecting an environmental condition in the external area surrounding the storage units using the sensor on the one or more storage units;
   C) comparing a signal from the sensor to alarm parameters stored in a controller and generating an alert signal from the controller when the signal exceeds the alarm parameters;
   D) transmitting the alert signal from the controller to a remote location in response to an environmental condition sensed by the sensor; and
   E) receiving the alert signal at the remote location and responding to the controller of the mobile storage system to adjust the mobile storage system to address the sensed environmental condition.

2. The method of claim 1 wherein the step of transmitting the alert signal comprises activating an alarm system.

3. The method of claim 2 wherein the step of transmitting the alert signal comprises sending the alert signal to a remote notification device to notify an individual of the sensed environmental condition.

4. The method of claim 1 wherein the controller is disposed on one of the storage units.

5. The method of claim 1 wherein the signal from the sensor is either a wired or wireless signal.

6. The method of claim 1 wherein a plurality of sensors are provided that are each configured to sense a different environmental condition.

7. The method of claim 6 wherein the environmental conditions sensed by the sensors are selected from the group consisting of: temperature, heat, humidity, light, water, air quality and vibration.

8. The method of claim 1 wherein the alert signal is transmitted from the controller to the remote location via the Internet.

* * * * *